(12) United States Patent
Seo

(10) Patent No.: US 7,496,040 B2
(45) Date of Patent: Feb. 24, 2009

(54) ROUNDTRIP DELAY TIME MEASUREMENT APPARATUS AND METHOD FOR VARIABLE BIT RATE MULTIMEDIA DATA

(76) Inventor: Kwang-Deok Seo, Computer & Information communications, College of Literature & Science, Yonsei University, Heungeop-Myeon, Wonju, Gangwon-Do (KR)

( * ) Notice: Subject to any disclaimer, the term of this patent is extended or adjusted under 35 U.S.C. 154(b) by 521 days.

(21) Appl. No.: 11/186,453

(22) Filed: Jul. 20, 2005

(65) Prior Publication Data
US 2006/0018266 A1    Jan. 26, 2006

(30) Foreign Application Priority Data
Jul. 22, 2004    (KR)    ............. 10-2004-0057272

(51) Int. Cl.
G01R 31/08    (2006.01)
(52) U.S. Cl. ............................................. 370/238
(58) Field of Classification Search ............... 370/238, 370/230.1, 232, 231, 395.64, 395.65
See application file for complete search history.

(56) References Cited

U.S. PATENT DOCUMENTS

| | | | |
|---|---|---|---|
| 5,812,528 A | 9/1998 | VanDervort | |
| 5,918,002 A | 6/1999 | Klemets et al. | |
| 5,940,370 A | 8/1999 | Simon et al. | |
| 6,097,697 A * | 8/2000 | Yao et al. | 370/230 |
| 6,643,612 B1 | 11/2003 | Lahat et al. | |
| 7,257,087 B2 * | 8/2007 | Grovenburg | 370/248 |
| 2002/0010938 A1 * | 1/2002 | Zhang et al. | 725/95 |
| 2002/0181494 A1 | 12/2002 | Injong | |
| 2002/0194361 A1 | 12/2002 | Itoh et al. | |
| 2003/0016627 A1 | 1/2003 | Patrick et al. | |
| 2003/0037158 A1 * | 2/2003 | Yano et al. | 709/232 |
| 2003/0103243 A1 | 6/2003 | Watanabe et al. | |
| 2003/0214908 A1 | 11/2003 | Anurag et al. | |
| 2004/0199659 A1 * | 10/2004 | Ishikawa et al. | 709/235 |
| 2007/0140128 A1 * | 6/2007 | Klinker et al. | 370/238 |

FOREIGN PATENT DOCUMENTS

| | | |
|---|---|---|
| JP | 11308271 | 11/1999 |
| JP | 2000-0106557 | 4/2000 |
| JP | 2002-084338 | 3/2002 |
| JP | 2004-135065 | 4/2004 |
| JP | 2004-186793 | 7/2004 |
| KR | 100227336 B1 | 8/1999 |
| KR | 1020010062189 A | 7/2001 |
| KR | 1020040002602 A | 1/2004 |
| WO | WO 03-026232 A1 | 3/2003 |
| WO | WO 2004/057817 A3 | 7/2004 |

OTHER PUBLICATIONS

Schulzrinne H et al. "RFC 1889: RTP: A transport protocol for real-time applications" Jan. 1996.

* cited by examiner

Primary Examiner—Kwang B. Yao
Assistant Examiner—Candal Elpenord

(57) ABSTRACT

An apparatus for measuring a roundtrip delay time associated with communication of multimedia data is provided. In one embodiment, the apparatus comprises a video encoder for encoding multimedia data to produce encoded multimedia data; a transmission rate controller for controlling transmission rate of the encoded multimedia data according to an effective transmission rate; and a first sending/receiving unit for sending the multimedia data via a first channel.

16 Claims, 4 Drawing Sheets

FIG. 1
RELATED ART

| V='2' | P | RC | PT='200' | RTCP LENGTH | | HEADER |
|---|---|---|---|---|---|---|
| SSRC OF SENDER | | | | | | |
| NTP TIME STAMP(UPPER 32 BITS) | | | | | | SENDER INFORMATION |
| NTP TIME STAMP(LOWER 32 BITS) | | | | | | |
| RTP TIME STAMP | | | | | | |
| SENDER'S PACKET COUNT | | | | | | |
| SENDER'S OCTET COUNT | | | | | | |
| SSRC OF FIRST SOURCE | | | | | | |
| FRACTION LOST | CUMULATIVE NUMBER OF PACKETS LOST | | | | | FIRST RECEPTION REPORT BLOCK |
| EXTENDED HIGHEST SEQUENCE NUMBER RECEIVED | | | | | | |
| INTERARRIVAL JITTER | | | | | | |
| LSR(LAST SR) | | | | | | |
| DLSR(DELAY SINCE LAST SR) | | | | | | |
| SSRC OF SECOND SOURCE | | | | | | SECOND RECEPTION REPORT BLOCK |
| • • • • • • | | | | | | |
| PROFILE-SPECIFIC EXTENSIONS | | | | | | |

FIG. 2
RELATED ART

| V='2' | P | RC | PT='201' | RTCP LENGTH | | HEADER |
|---|---|---|---|---|---|---|
| SSRC OF SENDER | | | | | | |
| SSRC OF FIRST SOURCE | | | | | | |
| FRACTION LOST | CUMULATIVE NUMBER OF PACKETS LOST | | | | | FIRST RECEPTION REPORT BLOCK |
| EXTENDED HIGHEST SEQUENCE NUMBER RECEIVED | | | | | | |
| INTERARRIVAL JITTER | | | | | | |
| LSR(LAST SR) | | | | | | |
| DLSR(DELAY SINCE LAST SR) | | | | | | |
| SSRC OF SECOND SOURCE | | | | | | SECOND RECEPTION REPORT BLOCK |
| • • • • • • | | | | | | |
| PROFILE-SPECIFIC EXTENSIONS | | | | | | |

ROUNDTRIP DELAY TIME MEASUREMENT APPARATUS AND METHOD FOR VARIABLE BIT RATE MULTIMEDIA DATA

CROSS REFERENCE TO RELATED APPLICATIONS

Pursuant to 35 U.S.C. § 119(a), this application claims the benefit of earlier filing date and right of priority to Korean Patent Application No. 57272/2004, filed on Jul. 22, 2004, the content of which is hereby incorporated by reference herein in its entirety.

FIELD OF THE INVENTION

The present invention relates to an apparatus and method for measuring a roundtrip delay time (RTT) used for effectively calculating the transmission rate at the time of sending a variable bit rate (VBR) multimedia data in a wireless communication network.

BACKGROUND OF THE INVENTION

In general, in order to send real-time video (or multimedia data) over wired/wireless Internet protocol (IP) networks, conditions such as a sufficient bandwidth of a channel, small delay, minimum packet loss, and the like must be satisfied. However, a network layer on current wired/wireless IP networks does not provide appropriate functions for satisfying quality of services (QoS) which are required for a video transmission.

Therefore, the QoS must be ensured by a higher layer of the network layer. A real-time transport protocol (RTP) and a real-time transport control protocol (RTCP) which are operated on a transport layer have been proposed. By using the RTP and RTCP, characteristics according to time limit can be considered, and it is possible to adaptively deal with a loss occurring within a network.

Since the RTCP provides to a sender (sending node) information of a current network condition and a reception QoS, the information provided can be used such that the sender automatically adapts to the network condition and the reception QoS to regulate a transmission rate, while a network manager measures a multicast performance.

FIG. 1 illustrates a structure of a sender report (SR) packet of the RTCP. FIG. 2 illustrates a structure of a receiver report (RR) packet of the RTCP. The SR packet is sent from the sender to the receiver when multimedia data is sent. The SR packet can be used when the sender performs sending and receiving at the same time or when sending. The RR packet is sent from the receiver to the sender when the multimedia data is received.

The SR packet and the RR packet include reception report blocks, respectively, each of which includes statistical information of RTP packets sent by one sender and feedbacks the statistical information from the receiver to the one sender. The SR packet further includes a packet length, sender information, sending time information, sender's packet count, and sender's octet count.

Each of the reception report blocks further includes information of such fraction loss, a last SR timestamp (LSR) and a delay since last SR (DLSR). The fraction loss denotes a packet loss rate, the LSR denotes 32 bits which are parts of 64 bits of a network time protocol (NTP) timestamp of a currently-received RTCP SR packet, and the DLSR denotes a delay time since the last SR packet.

The DLSR denotes, by $1/2^{32}$ ($1/65536$) second unit, the delay time until the reception report block of the RR is sent after the last SR packet of the sender is received. The time information associated with the packet sending such as the LSR, the DLSR may provide important information to estimate a transmission rate of the multimedia data to be transmitted later by the sender.

In a typical method for estimating an effective transmission rate using status information of a network, the RTT is used, and the RTT is measured by the SR and RR of the RTCP. The sender sends the SR which includes the NTP timestamp value when the message is sent. The receiver remembers the time of having received the SR. As a result, when the receiver sends the RR to the sender, the receiver records the time interval from the time of having received the SR and to the time of sending the RR in a DLSR field of the RR packet.

The receiver records information of partial bits of the NTP timestamp value of the received SR in an LSR field of the RR packet, and thereafter sends the RR packet to the sender. The sender checks its reception time of the RR packet. Thus, the sender subtracts the received DLSR field value and LSR field value from its reception time of the RR packet so as to measure the RTT.

Because the RTT is an instant RTT obtained from the RTCP SR packet information or the RTCP RR packet information, it is sensitive to instantaneous changes in a channel's mode. Therefore, when the effective transmission rate is estimated by adopting the RTT which is drastically changed according to the instantaneous change of the channel circumstance, the effective transmission rate also has severe fluctuation.

In the VBR multimedia sending system such as a VBR video sending system, a drastic fluctuation of the effective transmission rate causes a severe variation of image quality or sound quality. As a result, a great load is generated in controlling a buffer for a network transmission. Thus, the multimedia quality delivered is degraded.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for measuring a roundtrip delay time associated with communication of multimedia data is provided. In one embodiment, the apparatus comprises a video encoder for encoding multimedia data to produce encoded multimedia data; a transmission rate controller for controlling transmission rate of the encoded multimedia data according to an effective transmission rate; and a first sending/receiving unit for sending the multimedia data via a first channel.

In a preferred embodiment, the apparatus may also comprise a roundtrip delay time (RTT) measuring unit for measuring an instant roundtrip delay time using a receiver report (RR) packet received by the first sending/receiving unit; a moving average calculating unit for calculating a moving average roundtrip delay time using the measured instant roundtrip delay time; and a transmission rate estimating unit for estimating an effective transmission rate using the moving average roundtrip delay time and providing the estimated effective transmission rate to the transmission rate controller.

The apparatus, in one embodiment, further comprises a second sending/receiving unit for receiving the multimedia data via the first channel; and a channel reporting unit for checking a state of the first channel using the sender report (SR) packet received by the second sending/receiving unit to generate the receiver report (RR) packet, and sending the RR packet by the second sending/receiving unit. Also included may be a buffer/buffering controller for storing the multimedia data received by the second sending/receiving unit; and a video decoder for decoding the multimedia data stored by the buffer/buffering controller.

In a preferred embodiment, the moving average calculating unit measures the moving average roundtrip delay time according to RTT(t)=(1−j)·RTT(t−1)+j·RTTnew wherein, the RTTnew denotes a new instant roundtrip delay time, the RTT(t) denotes a roundtrip delay time value obtained by calculating the RTTnew and thereafter calculating the moving average of the RTTnew at time t, and the j denotes a weight for determining an adaptation speed with respect to the network state. The weight is established such that the moving average roundtrip delay time of the previous time has a greater weight than the new instant roundtrip delay time.

In a another preferred embodiment, the roundtrip delay time measuring unit measures the instant roundtrip delay time based on a reception time of the receiver report packet, a last SR field value and a delay measured according to last SR (DLSR) field value of the receiver report packet. The transmission rate estimating unit estimates the effective transmission rate according to $$R(t) = \frac{1.22 \times s}{RTT(t) \times \sqrt{p(t)}},$$

wherein the R(t) denotes the effective transmission rate, the p(t) denotes a packet loss rate, the RTT(t) denotes the moving average roundtrip delay time, and s denotes a packet size.

In accordance with another aspect of the invention, a method for measuring a roundtrip delay time of variable bit rate multimedia data received by a receiver in a communication network is provided. The method comprises receiving a receiver report packet of a real-time transport control protocol (RTCP) from a receiver; measuring a moving average roundtrip delay time based on information in the receiver report packet; and estimating an effective transmission rate using the measured moving average roundtrip delay time.

The measuring step comprises measuring a new instant roundtrip delay time using the receiver report packet; and measuring a current moving average roundtrip delay time by calculating the new instant roundtrip delay time and a previous moving average roundtrip delay time.

In one exemplary embodiment, the current moving average roundtrip delay time is measured according to: RTT(t)=(1−j)·RTT(t−1)+j·RTTnew, wherein the RTTnew denotes the new instant roundtrip delay time, the RTT(t) denotes a moving average roundtrip delay time calculated at time t, the RTT(t−1) denotes a moving average roundtrip delay time calculated at time t−1, and the j denotes a weight for determining an adaptation speed with respect to the network state. The weight is established such that the previous moving average roundtrip delay time (RTT(t−1)) has a greater weight than the new instant roundtrip delay time (RTTnew).

In one aspect, the instant roundtrip delay time is measured by calculating the reception time of the receiver report packet, a last SR (LSR) field value and a delay calculated based on last SR (DLSR) field value of the receiver report packet. The DLSR field value denotes the time interval between when the receiver receives the RTCP sender report (SR) and a time for sending the receiver report (RR) packet. The LSR field value determined based on a network time protocol (NTP) timestamp of the sender report packet, denotes a sending time of the sender report packet The method may further comprise controlling the transmission rate of multimedia data according to the estimated effective transmission rate. The effective transmission rate is estimated according to $$R(t) = \frac{1.22 \times s}{RTT(t) \times \sqrt{p(t)}},$$

wherein the R(t) denotes the effective transmission rate, the p(t) denotes a packet loss rate, the RTT(t) denotes the moving average roundtrip delay time, and s denotes a packet size.

In accordance with yet another aspect of the invention, a system for providing information to measure a roundtrip delay time associated with communication of multimedia data is provided. The system comprises a first sending/receiving unit for receiving encoded multimedia data via a first channel from a second sending/receiving unit; and a channel reporting unit for checking a state of the first channel using a sender report (SR) packet received from the first sending/receiving unit to generate the receiver report (RR) packet, and sending the RR packet to the second sending/receiving unit.

One embodiment may also comprise a buffer/buffering controller for buffering the multimedia data received from the second sending/receiving unit; and a video decoder for decoding the multimedia data stored in the buffer/buffering controller.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 1 illustrates a data structure of a related art RTCP sender report (SR) packet.

FIG. 2 illustrates a data structure of a related art RTCP receiver report (RR) packet.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 3:
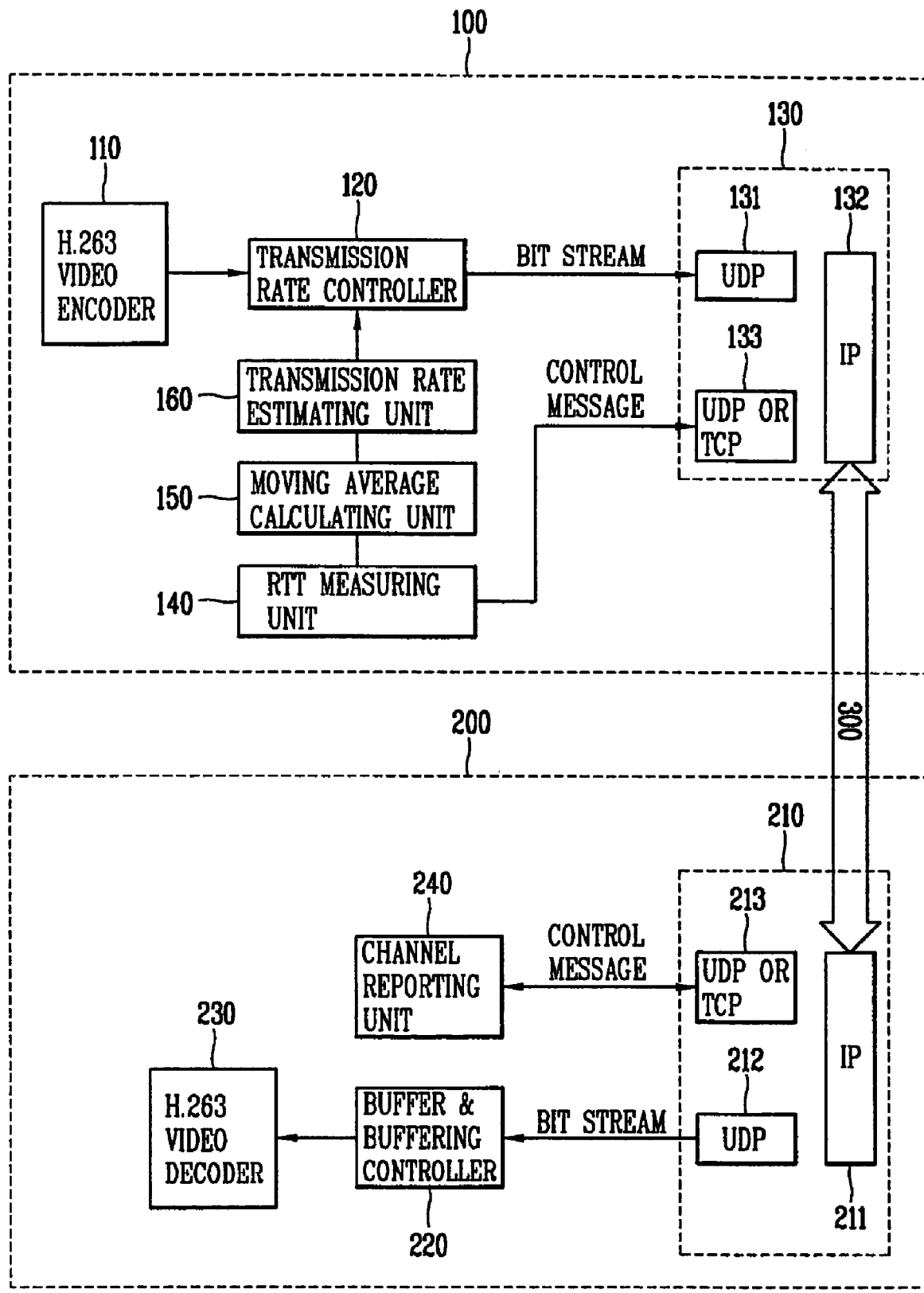
FIG. 3 illustrates a block diagram of an apparatus for measuring a roundtrip delay time of variable bit rate (VBR) multimedia data according to one embodiment of the present invention.

Referring to FIG. 3, a system block diagram for measuring a roundtrip delay time of variable bit rate (VBR) multimedia data according to the present invention is provided. As shown, the system comprises a real-time video sender 100 and a real-time video receiver 200.

In one embodiment, the real-time video sender 100 and the real-time video receiver 200 are connected to each other through a radio (e.g., wireless) network. In another embodiment, a wired network or a combination of wired and wireless networks may be implemented for connecting the video sender 100 and the video receiver 200 without detracting from the scope of the invention.

In one embodiment, the real-time video sender 100 comprises a video encoder 110 for encoding multimedia data, a transmission rate controller 120 for controlling the encoded multimedia data according to an effective transmission rate, and a sending/receiving unit 130 for sending the multimedia data to the real-time video receiver 200 via an allocated channel 300.

The video sender 100 preferably comprises a roundtrip delay time measuring unit 140 for measuring an instant roundtrip delay time using a real-time transport control protocol (RTCP) receiver report (RR) packet received through the sending/receiving unit 130; and a moving average calculating unit 150 for calculating a moving average roundtrip delay time using the measured instant roundtrip delay time.

In a preferred embodiment, a transmission rate estimating unit 160 is also included for estimating the effective transmission rate of multimedia data to be next sent using the calculated moving average roundtrip delay time and providing the estimated effective transmission rate to the transmission rate controller 120.

In accordance with one aspect of the invention, the real-time video receiver 200 comprises: a sending/receiving unit 210 for receiving the multimedia data sent by the real-time video sender 100 via the allocated channel, a channel reporting unit 240 for checking a state of the allocated channel 300 using an RTCP (Real-time Transport Control Protocol) SR (Sender Report) packet from sender 100 to generate an RTCP RR (Receiver Report) packet and send the RTCP RR packet to the real-time video sender 100 by the sending/receiving unit 210.

Also included in the sending/receiving unit 200 are preferably a buffer/buffering controller 220 for buffering the multimedia data received by the sending/receiving unit 210 and a decoder 230 for decoding the multimedia data having passed through the buffer/buffering controller 220. The sending/receiving units 130 and 210 may comprise an Internet protocol (IP), a transmission control protocol (TCP), and a user datagram protocol (UDP), or other suitable communication protocols depending on implementation.

Figure 4:
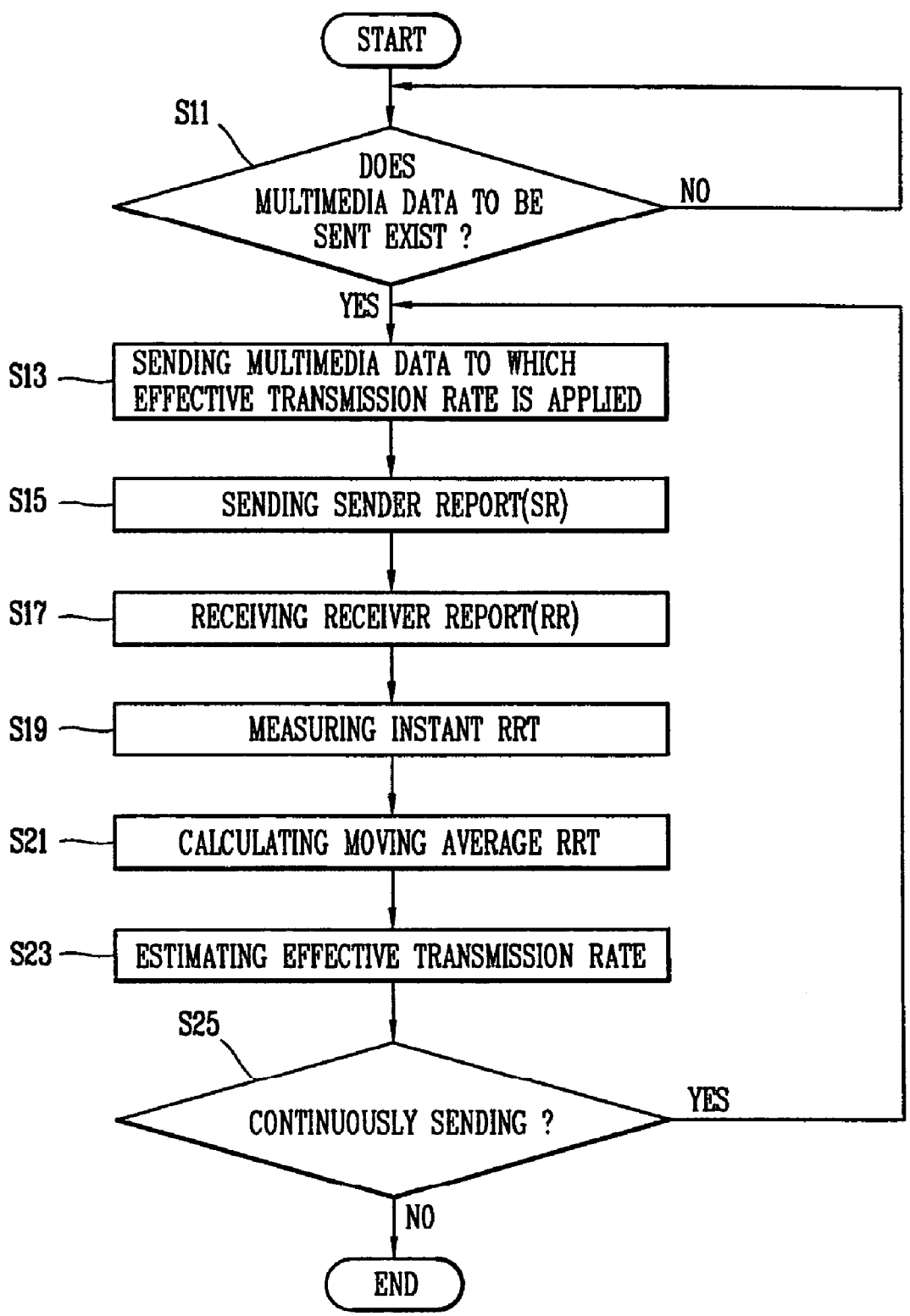
FIG. 4 is a flow diagram of a method for measuring a roundtrip delay time of variable bit rate (VBR) multimedia data according to one embodiment of the invention.

Referring to FIG. 4, a method for measuring a roundtrip delay time of VBR multimedia data according to one embodiment of the invention is provided.

The real-time video sender 100 detects whether there is any multimedia data to be transmitted (S11). If so, the real-time video sender 100 sends the multimedia data at the measured effective transmission rate (S13). The real-time video sender 100 then generates sender report (SR) information and sends the information (S15) to the real time video receiver 200.

The real-time video receiver 200 receives the multimedia data sent by the real-time video sender 100 via an allocated channel. The channel reporting unit 240 of the real-time video receiver 200 generates the RTCP RR packet to report information of the channel status and sends the RTCP RR packet to the real-time video sender 100 via the allocated channel 300.

The RTCP RR packet comprises information identifying the characteristics of the data communication between the video sender 100 and video receiver 200. Such information may comprise, for example, the RTCP packet length, sender identification, fraction loss, cumulative number of packets lost, extended highest sequence number received, last SR (LSR), delay since last SR (DLSR), etc.

Upon receiving the RTCP RR packet from the real-time video receiver 200 (S17), the roundtrip delay time (RTT) measuring units 140 of the real-time video sender 100 measures an instant RTT by analyzing the RTCP RR packet (S19). In one embodiment, the moving average calculating unit 150 of the real-time video sender 100 calculates a current moving average RTT using the instant RTT and a previous moving average RTT (S21).

The transmission rate estimating unit 160 of the real-time video sender 100 estimates the effective transmission rate using the measured moving average RTT and information such as a packet loss rate and the packet length (S23). The transmission rate estimating unit 160 provides the estimated effective transmission rate to the transmission rate controller 120.

If additional multimedia data is ready for transmission (S25), the system reverts to the earlier process and the transmission rate controller 120 controls the transmission rate of the multimedia data according to the effective transmission rate provided by the transmission rate estimating unit 160 (see S13).

An explanation will now be provided for a method for measuring the moving average RTT in order for the real-time video sender 100 to estimate the effective transmission rate which is gradually fluctuated by an instantaneous change of a network state.

In accordance with one embodiment, the method for measuring the moving average RTT is provided in Equation 1 below:

$$RTT(t)=(1-j)\cdot RTT(t-1)+j\cdot RTT_{new} \qquad \text{Equation 1}$$

The $RTT_{new}$ denotes a new instant RTT, for example, and the $RTT(t)$ denotes an RTT value obtained by calculating the $RTT_{new}$ and thereafter calculating the moving average for the $RTT_{new}$ at time t. The j denotes a weight for determining an adaptation speed with respect to the network state. When the j value is large, the effective transmission rate can rapidly be adapted to a new network state, which may cause a drastic fluctuation of the effective transmission rate.

Conversely, when the j value is small, the effective transmission rate is tolerant to the variation of the network state. Establishing the j value must be performed by considering a relationship between an adaptability according to the fluctuation of the effective transmission rate of the network and a drastic variation of multimedia quality. In an exemplary embodiment, when the j value is approximately 0.1 ~0.2, for example, the moving average calculating unit 150 and the transmission rate estimating unit 160 have good performance.

In a preferred embodiment, the new instant RTT ($RTT_{new}$) has greater weight than the moving average RTT $RTT(t-1)$ of the previous time t-1. As such, the transmission rate can gradually adapt to even a great instantaneous change in network load. The moving average RTT RTT(t) at the current time t is obtained by calculating the new instant RTT $RTT_{new}$, and thereafter calculating the measured instant RTT and the moving average RTT RTT(t−1) of the previous time t−1.

Figure 5:
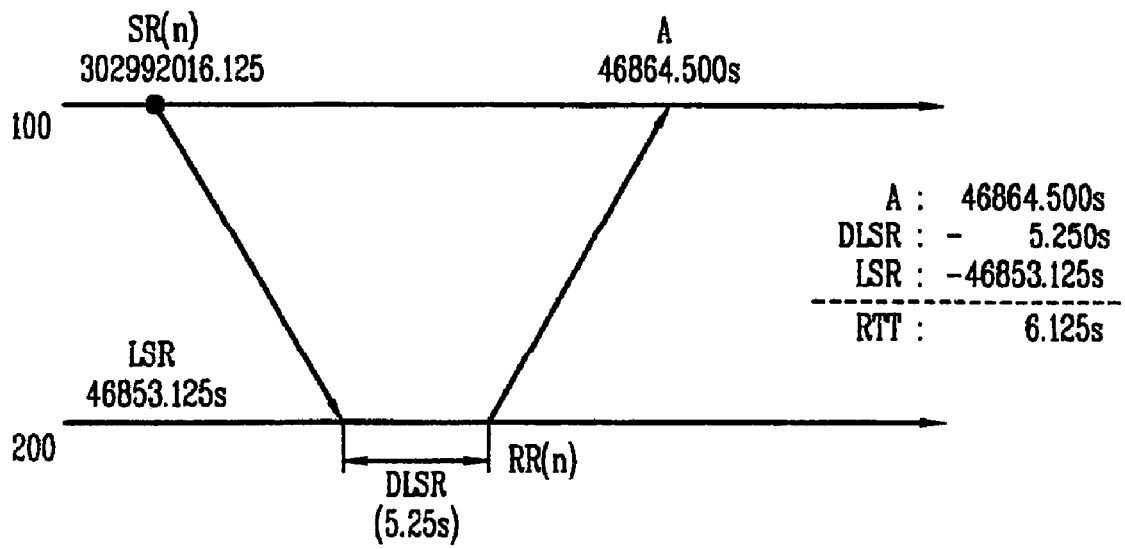
FIG. 5 illustrates a method for measuring an instant roundtrip delay time by a roundtrip delay time measuring unit according to one embodiment of the invention.

Referring to FIG. 5, the real-time video sender 100 records a sending time at the time of sending the SR packet. In one embodiment, an NTP (Network Time Protocol) timestamp value (e.g., 302992016.125) in the SR packet is used to record the time first and then send the SR packet. The sending time of the SR packet may be indicated with a real number portion and a decimal portion on the basis of a decimal point, for example.

In one embodiment, upper 32 bits (e.g., NTP timestamp (upper 32-bit) field in FIG. 1) are allocated to the real number portion and lower 32 bits (e.g., NTP timestamp (lower 32-bit) field) are allocated to the decimal portion.

The channel reporting unit 240 of the real-time video receiver 200 receives the SR packet, stores the reception time, and records the time interval from the reception time up to sending the RR packet in the DLSR field of the RR packet. The channel reporting unit 240 records information of partial bits of the NTP timestamp value of the received SR packet in the LSR field of the RR packet and then sends the RR packet to the real-time video sender 100.

The channel reporting unit 240, in a preferred embodiment, records time information which is indicated by 16 bits of the upper 32 bits of the NTP timestamp and 16 bits of the lower 32 bits of the NTP timestamp, in the LSR field of the RR packet. When the NTP timestamp value is 302991016.125, for example, the value of the LSR field is 46853.125 seconds.

In one embodiment, when the RR packet is received from the real-time video receiver 200, the RTT measuring unit 140 of the real-time video sender 100 checks the reception time A of the RR packet. The RRT measuring unit 140 then calculates the instant RRT by subtracting the DLSR field value and the LSR field value of the RR packet from the reception time A. If the reception time A, for instance, is 46864.500 seconds, the instant RTT, as shown in FIG. 5, is 6.125 seconds.

The RTT measuring unit 140 provides the calculated instant RTT to the moving average calculating unit 150. When the moving average RTT is measured according to Equation 1, the transmission rate estimating unit 160 estimates the effective transmission rate using a method provided in Equation 2:

$$R(t) = \frac{1.22 \times s}{RTT(t) \times \sqrt{p(t)}} \quad \text{Equation 2}$$

The R(t) denotes the effective transmission rate, the p(t) denotes the packet loss rate, which is determined based on a fraction loss field of the RR packet. The RRT(t) in one embodiment is a value measured by the same method as provided in Equation 1 by the moving average calculating unit 150 and denotes the moving average RTT. The 's' denotes a packet size.

Figure 6:
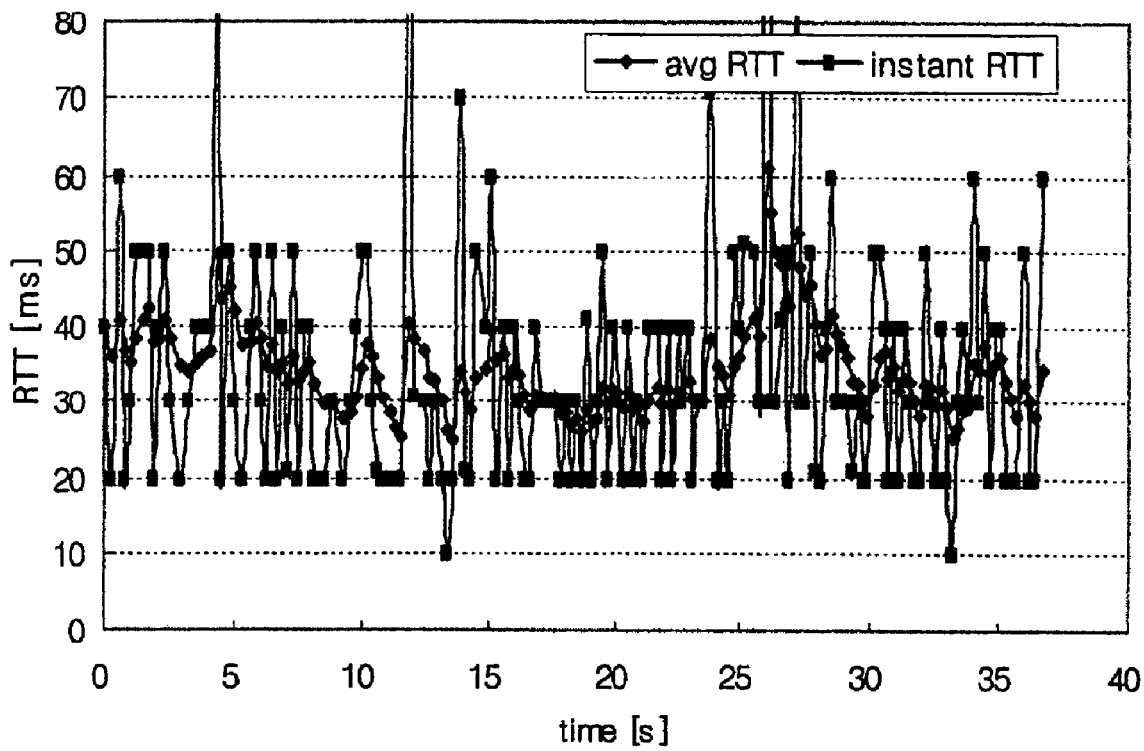
FIG. 6 is a graph showing a fluctuation range, respectively, of an instant roundtrip delay time and a moving average roundtrip delay time according to one embodiment of the invention.

FIG. 6 is a graph showing a fluctuation range, respectively, of the instant RTT and the moving average RTT. The instant RTT obtained by a typical RTT measuring method is updated whenever the RTCP packet is received, regardless of the previous value. The moving average RTT according to the present invention is, however, operated as a moving average value so it gradually fluctuates.

Thus, in the apparatus for measuring the RTT of the VBR multimedia data according to the present invention, an average value of network state information is used to estimate the effective transmission rate so that the transmission rate is gradually updated in response to an instantaneous change in the network state.

When the RTT information is measured by the moving average calculation, the effective transmission rate can be estimated by using the measured moving average RTT information. In one embodiment, the effective transmission rate gradually reflects a drastic change of the channel circumstance. As the effective transmission rate which is gradually fluctuated is estimated, the transmission rate of the multimedia data would not severely fluctuate. As a result, deterioration of the multimedia reception quality caused by the drastic change of image quality and sound quality can be reduced.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. An apparatus for measuring a roundtrip delay time associated with communication of multimedia data, the apparatus comprising:
   a video encoder for encoding multimedia data to produce encoded multimedia data;
   a transmission rate controller for controlling transmission rate of the encoded multimedia data according to a transmission rate;
   a first sending/receiving unit for sending the multimedia data via a first channel;
   a roundtrip delay time (RTT) measuring unit for measuring an instant roundtrip delay time using a receiver report (RR) packet received by the first sending/receiving unit;
   a moving average calculating unit for calculating a moving average roundtrip delay time using the measured instant roundtrip delay time; and
   a transmission rate estimating unit for estimating the transmission rate using the moving average roundtrip delay time and providing the estimated transmission rate to the transmission rate controller,
   wherein the moving average calculating unit measures the moving average roundtrip delay time according to:

$RTT(t)=(1-j)\cdot RTT(t-1)+j\cdot RTT_{new}$ wherein, the $RTT_{new}$ denotes a new instant roundtrip delay time, the RTT(t) denotes a roundtrip delay time value obtained by calculating the $RTT_{new}$ and thereafter calculating the moving average of the $RTT_{new}$ at time t, and the j denotes a weight for determining an adaptation speed with respect to the network state.

2. The apparatus of claim 1, further comprising:
   a second sending/receiving unit for receiving the multimedia data via the first channel; and
   a channel reporting unit for checking a state of the first channel using the sender report (SR) packet received by the second sending/receiving unit to generate the receiver report (RR) packet, and sending the RR packet by the second sending/receiving unit.

3. The apparatus of claim 2, further comprising:
   a buffer controller for storing the multimedia data received by the second sending/receiving unit; and
   a video decoder for decoding the multimedia data stored by the buffer controller.

4. The apparatus of claim 1, wherein the weight is established such that the moving average roundtrip delay time of the previous time has a greater weight than the new instant roundtrip delay time.

5. The apparatus of claim 1, wherein the roundtrip delay time measuring unit measures the instant roundtrip delay time based on a reception time of the receiver report packet, a last SR field value and a delay measured according to last SR (DLSR) field value of the receiver report packet.

6. The apparatus of claim 1, wherein the transmission rate estimating unit estimates the transmission rate according to:

$$R(t) = \frac{1.22 \times s}{RTT(t) \times \sqrt{p(t)}}$$

wherein the R(t) denotes the transmission rate, the p(t) denotes a packet loss rate, the RTT(t) denotes the moving average roundtrip delay time, and s denotes a packet size.

7. A method for measuring a roundtrip delay time of variable bit rate multimedia data received by a receiver in a communication network, the method comprising:
receiving a receiver report packet of a real-time transport control protocol (RTCP) from a receiver;
measuring a moving average roundtrip delay time based on information in the receiver report packet; and
estimating the transmission rate using the measured moving average roundtrip delay time,
wherein the moving average roundtrip delay time is measured according to:

$$RTT(t)=(1-j) \cdot RTT(t-1)+j \cdot RTT_{new}$$

wherein the RTTnew denotes the new instant roundtrip delay time, the RTT(t) denotes a moving average roundtrip delay time calculated at time t, the RTT(t−1) denotes a moving average roundtrip delay time calculated at time t−1, and the j denotes a weight for determining an adaptation speed with respect to the network state.

8. The method of claim 7, wherein the measuring step comprises:
measuring a new instant roundtrip delay time using the receiver report packet; and
measuring a current moving average roundtrip delay time by calculating the new instant roundtrip delay time and a previous moving average roundtrip delay time.

9. The method of claim 1, wherein the weight is established such that the previous moving average roundtrip delay time (RTT(t−1)) has a greater weight than the new instant roundtrip delay time ($RTT_{new}$).

10. The method of claim 8, wherein the instant roundtrip delay time is measured by calculating the reception time of the receiver report packet, a last SR (LSR) field value and a delay calculated based on last SR (DLSR) field value of the receiver report packet.

11. The method of claim 10, wherein the DLSR field value denotes the time interval between when the receiver receives the RTCP sender report (SR) and a time for sending the receiver report (RR) packet.

12. The method of claim 11, wherein the LSR field value determined based on a network time protocol (NTP) timestamp of the sender report packet, denotes a sending time of the sender report packet.

13. The method of claim 7, further comprising controlling the transmission rate of multimedia data according to the estimated transmission rate.

14. The method of claim 7, wherein the transmission rate is estimated according to:

$$R(t) = \frac{1.22 \times s}{RTT(t) \times \sqrt{p(t)}}$$

wherein the R(t) denotes the transmission rate, the p(t) denotes a packet loss rate, the RTT(t) denotes the moving average roundtrip delay time, and s denotes a packet size.

15. A system for providing information to measure a roundtrip delay time associated with communication of multimedia data, the system comprising:
a first sending/receiving unit for receiving encoded multimedia data via a first channel from a second sending/receiving unit; and
a channel reporting unit for checking a state of the first channel using a sender report (SR) packet received from the first sending/receiving unit to generate the receiver report (RR) packet, and sending the RR packet to the second sending/receiving unit,
wherein a current moving average roundtrip delay time for the encoded multimedia data is measured according to:

$$RTT(t)=(1-j) \cdot RTT(t-1)+j \cdot RTT_{new}$$

wherein the RTTnew denotes a new instant roundtrip delay time, the RTT(t) denotes a moving average roundtrip delay time calculated at time t, the RTT(t−1) denotes a moving average roundtrip delay time calculated at time t−1, and the j denotes a weight for determining an adaptation speed with respect to the network state.

16. The system of claim 15, further comprising:
a buffer controller for buffering the multimedia data received from the second sending/receiving unit; and
a video decoder for decoding the multimedia data stored in the buffer controller.

* * * * *